United States Patent
Rakesh et al.

(10) Patent No.: US 11,438,361 B2
(45) Date of Patent: Sep. 6, 2022

(54) METHOD AND SYSTEM FOR PREDICTING AN ATTACK PATH IN A COMPUTER NETWORK

(71) Applicant: Hitachi, Ltd., Tokyo (JP)

(72) Inventors: Ramesh Kumar Rakesh, Bangalore (IN); Remish Leonard Minz, Bangalore (IN); Sanjana Pai Nagarmat, Bangalore (IN)

(73) Assignee: HITACHI, LTD., Tokyo (JP)

( * ) Notice: Subject to any disclaimer, the term of this patent is extended or adjusted under 35 U.S.C. 154(b) by 364 days.

(21) Appl. No.: 16/699,191

(22) Filed: Nov. 29, 2019

(65) Prior Publication Data
US 2020/0304534 A1 Sep. 24, 2020

(30) Foreign Application Priority Data
Mar. 22, 2019 (IN) .............................. 201941011135

(51) Int. Cl.
*H04L 9/40* (2022.01)
*G06N 5/04* (2006.01)

(52) U.S. Cl.
CPC ........... *H04L 63/1433* (2013.01); *G06N 5/04* (2013.01); *H04L 63/1425* (2013.01)

(58) Field of Classification Search
CPC .... H04L 63/1433; H04L 63/1425; G06N 5/04
USPC .................................................. 726/22–25
See application file for complete search history.

(56) References Cited

U.S. PATENT DOCUMENTS

| | | | | |
|---|---|---|---|---|
| 8,856,936 B2* | 10/2014 | Datta Ray | ............... | H04L 63/20 726/25 |
| 9,210,185 B1* | 12/2015 | Pinney Wood | ........ | G06F 21/577 |
| 10,754,959 B1* | 8/2020 | Rajasooriya | ........ | H04L 63/1433 |
| 10,868,825 B1* | 12/2020 | Dominessy | ......... | H04L 63/1433 |
| 2002/0032871 A1* | 3/2002 | Malan | ..................... | H04L 43/00 726/23 |
| 2006/0218640 A1* | 9/2006 | Lotem | ................... | G06F 21/577 726/25 |

(Continued)

OTHER PUBLICATIONS

Indian Office Action received in corresponding Indian Application No. 201941011135 dated Feb. 22, 2021.

*Primary Examiner* — Kambiz Zand
*Assistant Examiner* — Mahabub S Ahmed
(74) *Attorney, Agent, or Firm* — Mattingly & Malur, PC

(57) ABSTRACT

The present disclosure discloses method and an attack path prediction system for predicting an attack path in a computer network. The attack path prediction system receives static and dynamic data associated with a source node attacked in computer network along with static and dynamic risk attributes of one or more vulnerabilities associated with one or more target nodes reachable from source node. A likelihood score is calculated for each of one or more vulnerabilities associated with one or more target nodes in relation to each of one or more vulnerabilities associated with source node based on static and dynamic risk attributes. Additionally, a prediction score is calculated for each of one or more vulnerabilities associated with target nodes based on corresponding likelihood score and static and dynamic risk attributes. Thereafter, based on prediction score, the attack path is predicted between the source node and one or more target nodes.

6 Claims, 8 Drawing Sheets

(56) References Cited

U.S. PATENT DOCUMENTS

| | | | |
|---|---|---|---|
| 2009/0099885 A1* | 4/2009 | Sung | G06Q 10/06 726/25 |
| 2009/0327195 A1* | 12/2009 | Iscen | G06N 5/042 706/50 |
| 2010/0082513 A1* | 4/2010 | Liu | G06N 3/006 706/46 |
| 2010/0242114 A1* | 9/2010 | Bunker | H04L 63/20 709/224 |
| 2012/0232679 A1* | 9/2012 | Abercrombie | G06Q 10/04 700/44 |
| 2013/0227695 A1* | 8/2013 | Shankar | G06F 21/577 726/25 |
| 2015/0033340 A1* | 1/2015 | Giokas | H04L 63/1433 726/23 |
| 2015/0058993 A1* | 2/2015 | Choi | H04L 63/1433 726/25 |
| 2015/0242637 A1* | 8/2015 | Tonn | H04L 63/1441 726/25 |
| 2015/0278729 A1* | 10/2015 | Hu | G06Q 10/0635 705/7.28 |
| 2016/0164905 A1* | 6/2016 | Pinney Wood | G06F 21/577 726/25 |
| 2016/0205122 A1* | 7/2016 | Bassett | G06F 21/577 726/23 |
| 2017/0046519 A1* | 2/2017 | Cam | G06F 21/577 |
| 2017/0048266 A1* | 2/2017 | Hovor | H04L 63/1433 |
| 2017/0078322 A1* | 3/2017 | Seiver | H04L 63/1466 |
| 2017/0118240 A1* | 4/2017 | Devi Reddy | G06N 7/005 |
| 2017/0243485 A1* | 8/2017 | Rubin | H04W 4/12 |
| 2017/0286690 A1* | 10/2017 | Chari | G06F 21/577 |
| 2017/0346839 A1* | 11/2017 | Peppe | G06F 21/552 |
| 2018/0048669 A1* | 2/2018 | Lokamathe | G06N 5/04 |
| 2018/0159874 A1* | 6/2018 | Ricafort | H04L 63/0272 |
| 2018/0197128 A1* | 7/2018 | Carstens | G06F 40/205 |
| 2019/0190955 A1* | 6/2019 | Khan | H04L 63/20 |
| 2019/0260795 A1* | 8/2019 | Araiza | G06N 20/20 |
| 2019/0289029 A1* | 9/2019 | Chawla | H04L 63/1425 |
| 2020/0067962 A1* | 2/2020 | Tan | G06N 5/02 |
| 2020/0110873 A1* | 4/2020 | Rosendahl | G06F 21/577 |
| 2020/0137104 A1* | 4/2020 | Hassanzadeh | H04L 63/1433 |
| 2020/0177618 A1* | 6/2020 | Hassanzadeh | H04L 63/1433 |
| 2020/0177619 A1* | 6/2020 | Hadar | H04L 63/1433 |
| 2020/0210590 A1* | 7/2020 | Doyle | G06N 20/00 |
| 2020/0296138 A1* | 9/2020 | Crabtree | H04L 63/1425 |
| 2020/0351298 A1* | 11/2020 | Paturi | G06N 5/04 |
| 2020/0389483 A1* | 12/2020 | Dye | H05K 999/99 |
| 2021/0012014 A1* | 1/2021 | Yamamoto | G06F 21/577 |
| 2021/0209232 A1* | 7/2021 | Shim | G06F 21/577 |
| 2021/0360032 A1* | 11/2021 | Crabtree | H04L 63/20 |

\* cited by examiner

METHOD AND SYSTEM FOR PREDICTING AN ATTACK PATH IN A COMPUTER NETWORK

CROSS-REFERENCE TO RELATED APPLICATION

The present application claims priority from Indian patent application IN 201941011135 filed on Mar. 22, 2019, the content of which is hereby incorporated by reference into this application.

TECHNICAL FIELD

The present subject matter is related in general to network security, more particularly, but not exclusively to a method and system for predicting an attack path in a computer network.

BACKGROUND

Today, cyber security which includes internet, network, and software security is one of the fastest growing fields in computer technology. Over past decade, people have become more aware of need for information security as intrusions, attacks, and viruses have become more frequent and widespread. With increase in network intrusion, currently network professionals are trying to catch up and improvise their level of knowledge to counter against advanced level of exploitation tools available in the market.

Typically, in cyber-attack through gateway servers, devices are attacked by targeting existing vulnerabilities of devices in step by step mechanism. Vulnerabilities in network connected devices which are in first layer of the network (referred as first layer devices) are attacked to get access to first layer devices. Once the first layer devices are accessible, attackers try to scan second reachable layer of devices to detect vulnerabilities in the second layer of devices. Thereafter, the attackers try to exploit the vulnerabilities in the second layer to get an access to the second layer of devices. In this manner the attackers reach the target device and exploits the complete network.

Generally, in each layer, the attackers have a choice of device to attack and which vulnerability of the device to exploit to access the device. In this manner a path of attacks is made after the target device is compromised. Conventional systems attempt to correlate vulnerabilities to predict an attack path. However, the correlation is based on the static properties of the vulnerabilities which may not result in precise and efficient attack path identification.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for predicting an attack path in a computer network. The method comprises receiving static and dynamic data associated with a source node attacked in the computer network from an attack detection system. The static and dynamic data comprises information regarding the source node and one or more vulnerabilities associated with the source node. The method comprises obtaining static and dynamic risk attributes of one or more vulnerabilities associated with one or more target nodes reachable from the source node in the computer network. Further, a likelihood score is calculated for each of the one or more vulnerabilities associated with the one or more target nodes in relation to each of the one or more vulnerabilities associated with the source node based on the static and dynamic risk attributes. The method comprises calculating a prediction score for each of the one or more vulnerabilities associated with the one or more target nodes based on corresponding likelihood score and the static and dynamic risk attributes. Thereafter, based on the prediction score, the attack path is predicted between the source node and the one or more target nodes in the computer network.

In an embodiment, the present disclosure may relate to an attack path prediction system for predicting an attack path in a computer network. The attack path prediction system may comprise a plurality of processors and a memory communicatively coupled to the processors, where the memory stores processors executable instructions, which, on execution, may cause the attack path prediction system to receive static and dynamic data associated with a source node attacked in the computer network from an attack detection system. The static and dynamic data comprises information regarding the source node and one or more vulnerabilities associated with the source node. The attack path prediction system obtains static and dynamic risk attributes of one or more vulnerabilities associated with one or more target nodes reachable from the source node in the computer network. Further, for each of the one or more vulnerabilities associated with the one or more target nodes, the attack path prediction system calculates a likelihood score in relation to each of the one or more vulnerabilities associated with the source node based on the static and dynamic risk attributes. The attack path prediction system calculates a prediction score for each of the one or more vulnerabilities associated with the one or more target nodes based on corresponding likelihood score and the static and dynamic risk attributes. Thereafter, based on the prediction score, the attack path prediction system predicts the attack path between the source node and the one or more target nodes in the computer network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 2d-2e show exemplary representations of user interface depicting attack path on selection of one and two vulnerability respectively in accordance with some embodiments of the present disclosure;

Figure 1:
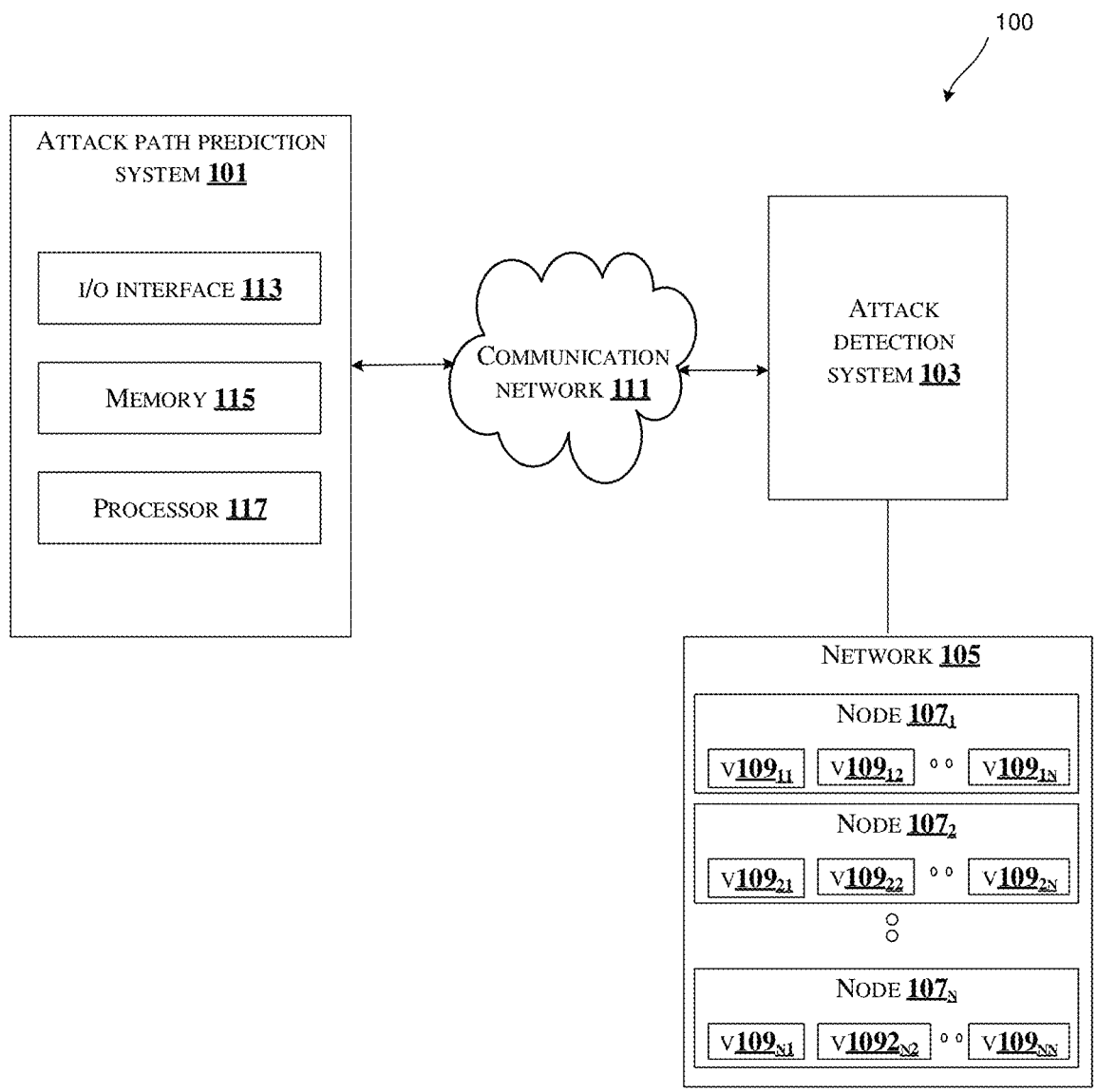
FIG. 1 illustrates an exemplary environment for predicting an attack path in a computer network in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and shows by way of illustration, specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure relates to a method and an attack path prediction system for predicting an attack path in a computer network. In an embodiment, the attack path may be defined as a path used by an intruder to gain access to the computer network in order exploit network vulnerabilities. In an embodiment, the computer network is a group of computer nodes/devices and other computing hardware devices which are linked together through communication channels to facilitate communication and resource-sharing among a wide range of users. Typically, when a node, referred as a source node is attacked in the computer network, the attack path prediction system receives static and dynamic data for the source node from an attack detection system associated with the computer network. In an embodiment, the attack detection system may refer to an intrusion detection system which monitors network traffic for suspicious activities and issues alerts on detection on such activities. In an embodiment, the static and dynamic data includes information regarding the source node and one or more vulnerabilities associated with the source node.

A likelihood score for one or more vulnerabilities associated with one or more target nodes is calculated in relation to one or more vulnerabilities associated with the source node. In an embodiment, the one or more target nodes may refer to nodes which may be targeted subsequently in the computer network. Further, a prediction score for each of the one or more vulnerabilities associated with the one or more target nodes is calculated which is used for predicting the attack path between the source node and the one or more target nodes in the computer network. The present disclosure precisely predicts the attack path and thereby helps network security administrators/managers in protecting network infrastructure more effectively.

FIG. 1 illustrate an exemplary environment for predicting an attack path in a computer network in accordance with some embodiments of the present disclosure.

As shown in FIG. 1, an environment 100 includes an attack path prediction system 101 connected through a communication network 111 to an attack detection system 103. In an embodiment, the attack detection system 103 may refer to an intrusion detection system which monitors network traffic for suspicious activities and issues alerts on detection of such activities. Typically, attack detection system 103 may include, for example, signature-based detection system, anomaly-based detection system and the like. The attack detection system 103 may be associated with a network 105 in order to detect one or more attacks in the network 105. In an embodiment, the network 105 may be a computer network which include nodes ($107_1$-$107_N$) (collectively referred as plurality of nodes 107). In an embodiment, the plurality of nodes 107 may be inter-connected with each other. In an embodiment, the plurality of nodes 107 may be devices such as, computers, switches, modems, hubs and the like. A person skilled in the art would understand that the plurality of nodes 107 may include any other network devices, not mentioned herein explicitly. Further, each of the plurality of nodes 107 includes respective vulnerabilities. For instance, the node $107_1$ include vulnerabilities ($V109_{11}$-, $V109_{1N}$). Similarly, other nodes from the plurality of nodes 107 comprises respective vulnerabilities (collectively referred as one or more vulnerabilities 109). In an embodiment, the one or more vulnerabilities 109 may refer to a flaw in a system that creates a potential point of security compromise for an endpoint or network.

The attack path prediction system 101 may correlate the one or more vulnerabilities 109 in order to predict an attack path for the network 105. In an embodiment, the attack path may represent a path used by an intruder to gain access to the network 105 in order exploit network vulnerabilities. In one embodiment, the attack path prediction system 101 may include, but is not limited to, a laptop, a desktop computer, a Personal Digital Assistant (PDA), a notebook, a smartphone, IOT devices, a tablet, a server, and any other computing devices. A person skilled in the art would understand that, any other devices, not mentioned explicitly, may also be used as the attack path prediction system 101 in the present disclosure. Further, the attack path prediction system 101 may include an I/O interface 113, a memory 115 and a processor 117. The I/O interface 113 may be configured to receive static and dynamic data associated with a source node attacked in the network 105 from the attack detection system 103. Further, the I/O interface 113 may be configured to receive static and dynamic risk attributes of one or more vulnerabilities associated with one or more target nodes. The static and dynamic data and static and dynamic risk attributes received from the I/O interface 113 may be stored in the memory 115. The memory 115 may be communicatively coupled to the processor 117 of the attack path prediction system 101. The memory 115 may also store processor instructions which may cause the processor 117 to execute the instructions for predicting the attack path in the network 105.

Typically, the attack path prediction system 101 associated with the network 105 may monitor the network 105 in order to detect any attacks in the network 105. In case of detection of any attacks, the attack detection system 103 may provide details associated with the attack to the attack path prediction system 101 through the communication network 111. In an embodiment, the communication network 111 may include, but is not limited to, a direct interconnection, an e-commerce network, a Peer-to-Peer (P2P) network, Local Area Network (LAN), Wide Area Network (WAN), wireless network (for example, using Wireless Application Protocol), Internet, Wi-Fi and the like.

Thus, the attack path prediction system 101 may receive the static and dynamic data associated with a node from the plurality of nodes 107 which is attacked in the network 105. The node attacked in the network 105 may be referred herein as the source node. For instance, the node $107_1$ may be referred as the source node, in case the node $107_1$ is attacked in the network 105. In an embodiment, the static and dynamic data may include information regarding the source node and the one or more vulnerabilities associated with the source node. Further, the attack path prediction system 101 may obtain the static and dynamic risk attributes of one or more vulnerabilities associated with one or more nodes from the plurality of nodes 107 which may be reachable from the source node in the network 105.

The one or more nodes which are reachable from the source node are referred herein as the one or more target nodes. In an embodiment, the static risk attributes comprise predefined Common Vulnerability Scoring System score (CVSS) for each of the one or more vulnerabilities. Similarly, the dynamic risk attributes include a correlation score, attacker skill indicator and topological impact on node. A person skilled in the art would understand that the static and dynamic risk attributes may also include any other attributes not defined explicitly in the present disclosure. Further, based on the static and dynamic risk attributes, the attack path prediction system 101 may calculate a likelihood score for each of the one or more vulnerabilities associated with the one or more target nodes in relation to each of the one or more vulnerabilities associated with the source node. Particularly, the likelihood score for each of the one or more vulnerabilities is calculated based on a corresponding correlation score and the Common Vulnerability Scoring System score (CVSS). In an embodiment, the correlation score for each of the one or more vulnerabilities is calculated based on number of attack intention common between a vulnerability of the one or more vulnerabilities associated with the source node and a vulnerability associated with each of the one or more target nodes and total number of attack intention for the vulnerability associated with the source node. Further, the attack path prediction system 101 may predict a prediction score for each of the one or more vulnerabilities associated with the one or more target nodes based on the corresponding likelihood score and the static and dynamic risk attributes. Particularly, the prediction score is calculated based on the corresponding likelihood score and the corresponding Common Vulnerability Scoring System score (CVSS). Thereafter, based on the prediction score, the attack path prediction system 101 predicts the attack path between the source node and the one or more target nodes in the network 105. In an embodiment, the attack path prediction system 101 may generate an attack path graph based on the prediction score.

Figure 2A:
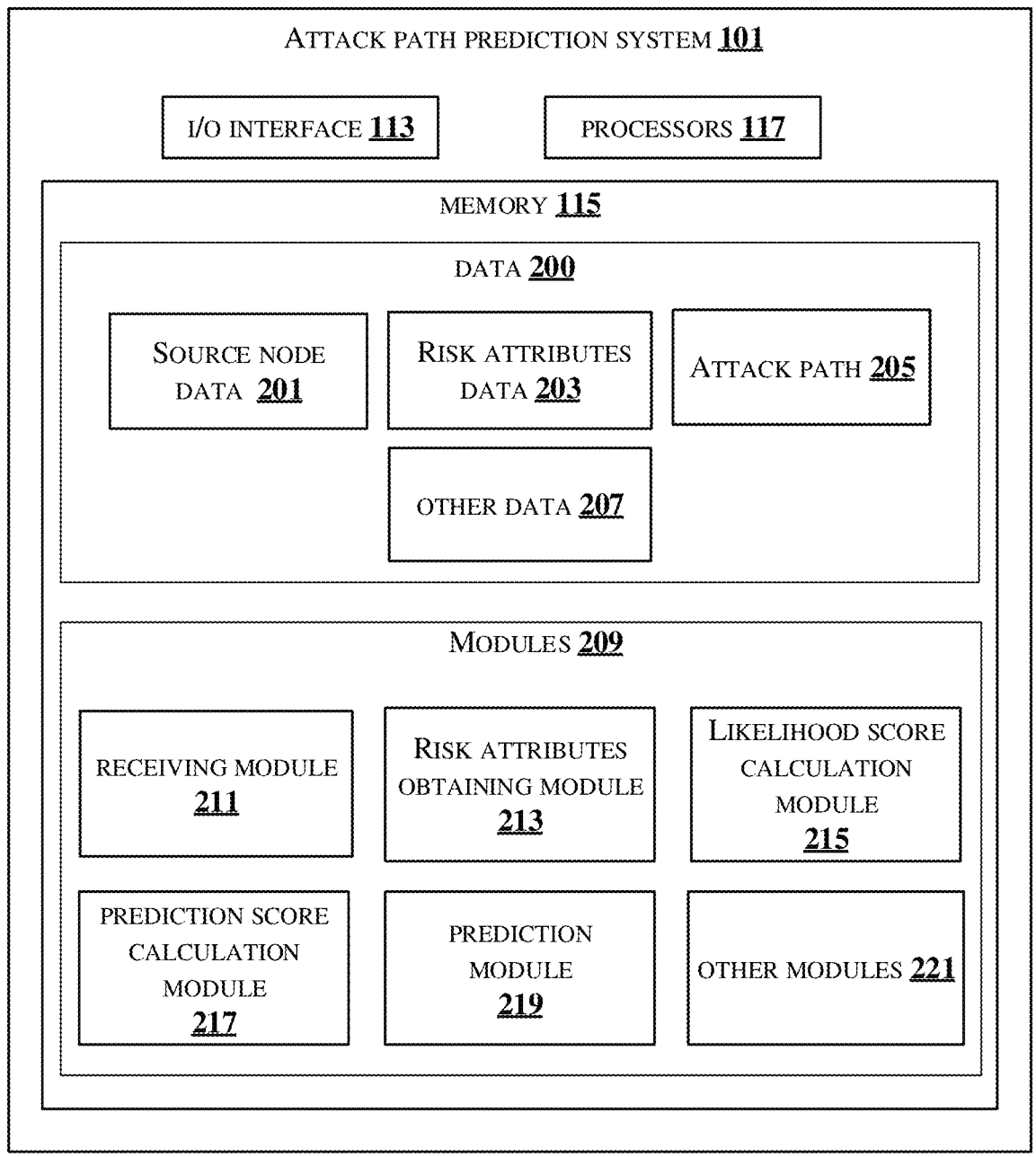
FIG. 2a illustrates a detailed block diagram of an attack path prediction system in accordance with some embodiments of the present disclosure.

FIG. 2a illustrates a detailed bock diagram of an attack path prediction system in accordance with some embodiments of the present disclosure.

As shown in FIG. 2a, the attack path prediction system 101 may include data 200 and one or more modules 209 which are described herein in detail. In an embodiment, data 200 may be stored within the memory 115. The data 200 may include, for example, source node data 201, risk attributes data 203, attack path 205 and other data 207.

The source node data 201 may include static and dynamic data associated with the source node in the network 105. For instance, the static and dynamic data comprises information regarding the source node and one or more vulnerabilities associated with the source node.

The risk attributes data 203 may include the static and dynamic risk attributes of one or more vulnerabilities associated with the one or more target nodes. In an embodiment, the static risk attributes may include the predefined Common Vulnerability Scoring System score (CVSS).

In an embodiment, the dynamic risk attributes may include the correlation score, the attacker skill indicator and topological impact on node.

The attack path 205 may refer to the attack path predicted for the network 105 based on the prediction score. Particularly, the attack path 205 may include the attack path graph for the network 105.

The other data 207 may store data, including temporary data and temporary files, generated by one or more modules 209 for performing the various functions of the attack path prediction system 101.

In an embodiment, the data 200 in the memory 115 are processed by the one or more modules 209 present within the memory 115 of the attack path prediction system 101. In an embodiment, the one or more modules 209 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 209 may be communicatively coupled to the processors 117 for performing one or more functions of the attack path prediction system 101. The one or more modules 209 when configured with the functionality defined in the present disclosure will result in a novel hardware.

In one implementation, the one or more modules 209 may include, but are not limited to a receiving module 211, a risk attributes obtaining module 213, a likelihood score calculation module 215, a prediction score calculation module 217 and a prediction module 219. The one or more modules 209 may also include other modules 221 to perform various miscellaneous functionalities of the attack path prediction system 101. In an embodiment, the other modules 221 may include an attack path generation system which may generate the attack path graph for the network 105.

Figure 2B:
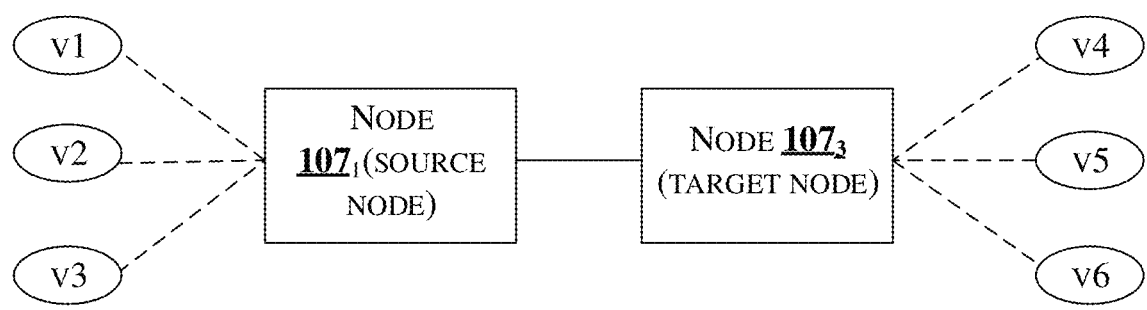
FIG. 2b shows an exemplary representation of network nodes in a network in accordance with some embodiments of the present disclosure.

The receiving module 211 may receive the static and the dynamic data associated with the source node attacked in the network 105 from the attack detection system 103. In an embodiment, the static and dynamic data may include information regarding the source node and one or more vulnerabilities associated with the source node. FIG. 2b show exemplary network nodes in a network in accordance with some embodiments of the present disclosure.

For instance, FIG. 2b shows an instance of the network 105 in which the node $107_1$ is attacked from the plurality of nodes 107 and hence referred as the source node. The source node $107_1$ includes three vulnerabilities namely, V1, V2 and V3. The source node $107_1$ is connected to a node $107_3$ which may be considered for the attack. Thus, the node $107_3$ is referred as the target node $107_3$. The target node $107_3$ includes three vulnerabilities namely, V4, V5 and V6 as shown in the FIG. 2b. Thus, in this case, the receiving module 211 may receive the information regarding the source node $107_1$ and the associated vulnerabilities V1, V2 and V3. Table 1 below represents an exemplary information regarding the vulnerabilities associated with the source node $107_1$.

TABLE 1

| Vulnerabilities | Description |
| --- | --- |
| V1 | Remove SQL injection authentication bypass in HPE network automation versions |
| V2 | WebSphere portal could allow remote attacker traverse directories in system |
| V3 | Worklight is vulnerable to cross site scripting. Allow user to embed arbitrary JavaScript code in web UI |

Returning to FIG. 2a, the risk attributes obtaining module 213 may obtain the static and dynamic risk attributes of the one or more vulnerabilities associated with the one or more target nodes reachable from the source node in the network 105. In an embodiment, the static risk attributes include the predefined Common Vulnerability Scoring System score (CVSS). Similarly, the dynamic risk attributes include the correlation score, the attacker skill indicator and the topological impact on node. For instance, in FIG. 2b, the risk attributes for the vulnerabilities V4, V5 and V6 of the target node $107_3$ may be obtained. Table 2 below represents an exemplary information regarding the vulnerabilities associated with the target node $107_3$.

TABLE 2

| Vulnerabilities | Description |
| --- | --- |
| V4 | Cross sight scripting exists in review section in PHP scripts mail hot script classified 3.1 via title |
| V5 | Remote SQL injection vulnerability in HPE network automation versions |
| V6 | Adobe flash player has an exploitable memory corruption vulnerability in Mp4 atom parser |

Further, the dynamic risk attributes for the vulnerabilities are shown from table 3-table 6 below. Table 3 shows an exemplary predefined CVSS score for the vulnerabilities V1-V6.

TABLE 3

| Vulnerabilities | CVSS score |
| --- | --- |
| V1 | 0.39 |
| V2 | 0.39 |
| V3 | 0.28 |
| V4 | 0.23 |
| V5 | 0.39 |
| V6 | 0.39 |

Table 4 shows an exemplary attack type and intention for SQL injection.

TABLE 4

| Attack Type | Attack Intention |
| --- | --- |
| Tautologies | Bypassing Authentication, Identification of Injectable parameters |
| Union Query | Bypassing Authentication, Data Extraction |
| Piggy Backed Query (Ref: V5 in Table 4) | Data Extraction, Data modification, DoS, Remote command Execution |
| Stored Procedure (Ref: V1 in Table 4) | Data Extraction, Privilege escalation, DoS, Remote command execution |

Table 5 shows an exemplary attack type and intention for cross site scripting.

TABLE 5

| Attack Type | Attack Intention |
| --- | --- |
| Stored XSS (Reference: V4 in Table 6) | Browser data extraction for stored user data |
| Reflected XSS | Browser data extraction for cookies data |
| DOM based XSS (Reference: V3 in Table 6) | Data flow extraction from source to browser |

Further, table 6 below shows an exemplary attack type for the vulnerabilities based on CVSS score.

TABLE 6

| | Attack type |
| --- | --- |
| V1 | Stored Procedure |
| V5 | Piggy Backed Query |
| V3 | Dom Based XSS |
| V4 | Stored XSS |

Returning to FIG. 2a, the likelihood score calculation module 215 may calculate the likelihood score for each of the one or more vulnerabilities associated with the one or more target nodes in relation to each of the one or more vulnerabilities associated with the source node 107₁. The likelihood score is calculated based on an equation 1 as show below:

$$\text{Likelihood Score} = [1 + ((CVSS)^{-1} - 1) * (\text{Correlation Score})] \quad (1)$$

Thus, $$\text{Likelihood Score for } V5 = [1 + (2.5641 - 1) * (3/4)] = [2.173075]$$

Thus, Likelihood Score for V5 in relation to V1=2.173075

The likelihood score calculation module 215 may use the correlation score for each of the one or more vulnerabilities and the predefined CVSS score to calculate the likelihood score. In an embodiment, the correlation score is calculated based on number of attack intention common between a vulnerability of the one or more vulnerabilities associated with the source node 107₁ and a vulnerability associated with each of the one or more target nodes and total number of attack intention for the vulnerability associated with the source node 107₁. For instance, considering the FIG. 2b, the correlation score calculation for example, for V5 and V1 is shown below in equation 2.

$$\text{Correlation score} = \frac{\text{Attack Intention common in } V1, V5}{\text{total attack intention in } V1} \quad (2)$$

For instance, the common attack intention between V1 and V5 are three namely, data extraction, DoS and remote command execution and the total attack intention in V1 is four, namely, data extraction, privilege escalation, DoS, remote command execution. Thus, the correlation score for V1 and V5 is represented in equation 3.

$$\text{Correlation score} = \frac{[\text{data extarction, DOS, remote xommand execution}]}{[\text{data extraction, privilege escalation, DOS, remote command execution}]} \quad (3)$$

Thus, correlation score=¾

Figure 2C:
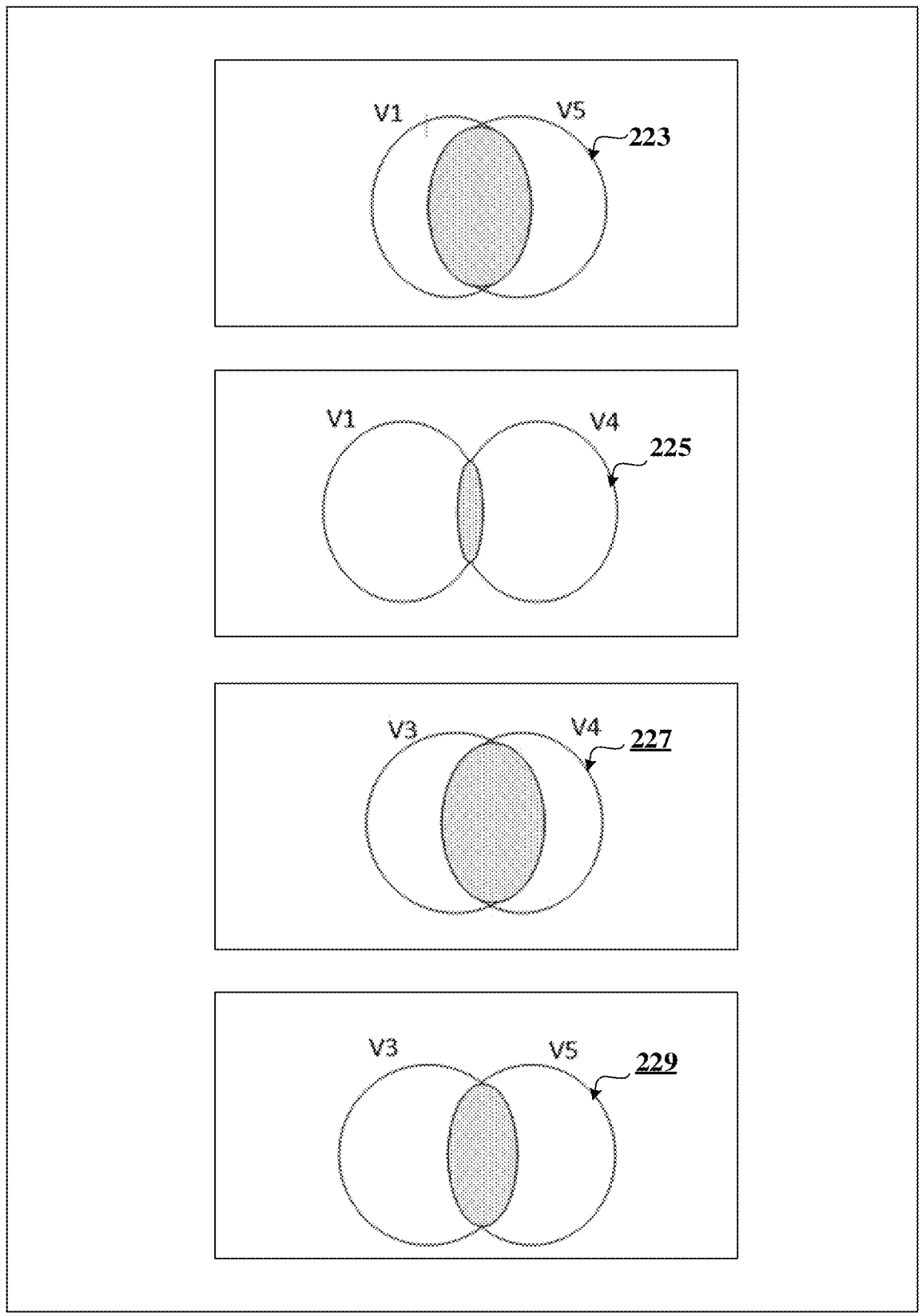
FIG. 2c shows an exemplary representation of likelihood score in accordance with some embodiments of the present disclosure.

FIG. 2c shows an exemplary representation of likelihood score in accordance with some embodiment of the present disclosure. As shown, FIG. 2c shows Venn diagram representation for common attack intention between V1 and V5 represented as 223, between V1 and V4 represented as 225, between V3 and V4 represented as 227 and between V3 and V5 represented as 229.

Table 7 below shows exemplary correlation scores calculated based on equation (2) for the vulnerabilities (V4-V6) of the target node 107₃ with respect to vulnerability V1 of source node 107₁ in FIG. 2b.

TABLE 7

| Node1/Node2 | Vulnerability 1 |
|---|---|
| V4 | ¼ |
| V5 | ¾ |
| V6 | 0 |

Further, table 8 below shows exemplary likelihood score calculated using the equation (1) for the vulnerabilities (V4-V6) of the target node 107₃ with respect to vulnerability V1 of source node 107₁ in FIG. 2b.

TABLE 8

| Node1/Node2 | Vulnerability 1 |
|---|---|
| V4 | 1.8369 |
| V5 | 2.173075 |
| V6 | 1 |

Returning back to FIG. 2a, the prediction score calculation module 217 may calculate the prediction score for each of the one or more vulnerabilities associated with the one or more target nodes based on corresponding likelihood score and the static and dynamic risk attributes. The prediction score is calculated based on an equation 4 as show below.

$$\text{Prediction Score}=(CVSS)*(\text{Likelihood Score}) \quad (4)$$

Thus, prediction score of V5 with respect to V1=(0.39) *2.173075=0.84749925

Where, CVSS score of V5 is referred from table 3 and likelihood score is referred from table 8.

Further, table 9 below shows an exemplary prediction score calculated based on the equation (4) for the vulnerabilities (V4-V6) of the target node 107₃ with respect to vulnerability V1 of source node 107₁ in FIG. 2b.

TABLE 9

| Node1/ Node2 | V1 |
|---|---|
| V4 | 0.4225 |
| V5 | 0.84749925 |
| V6 | 0.39 |

Figures 2D, 2E:
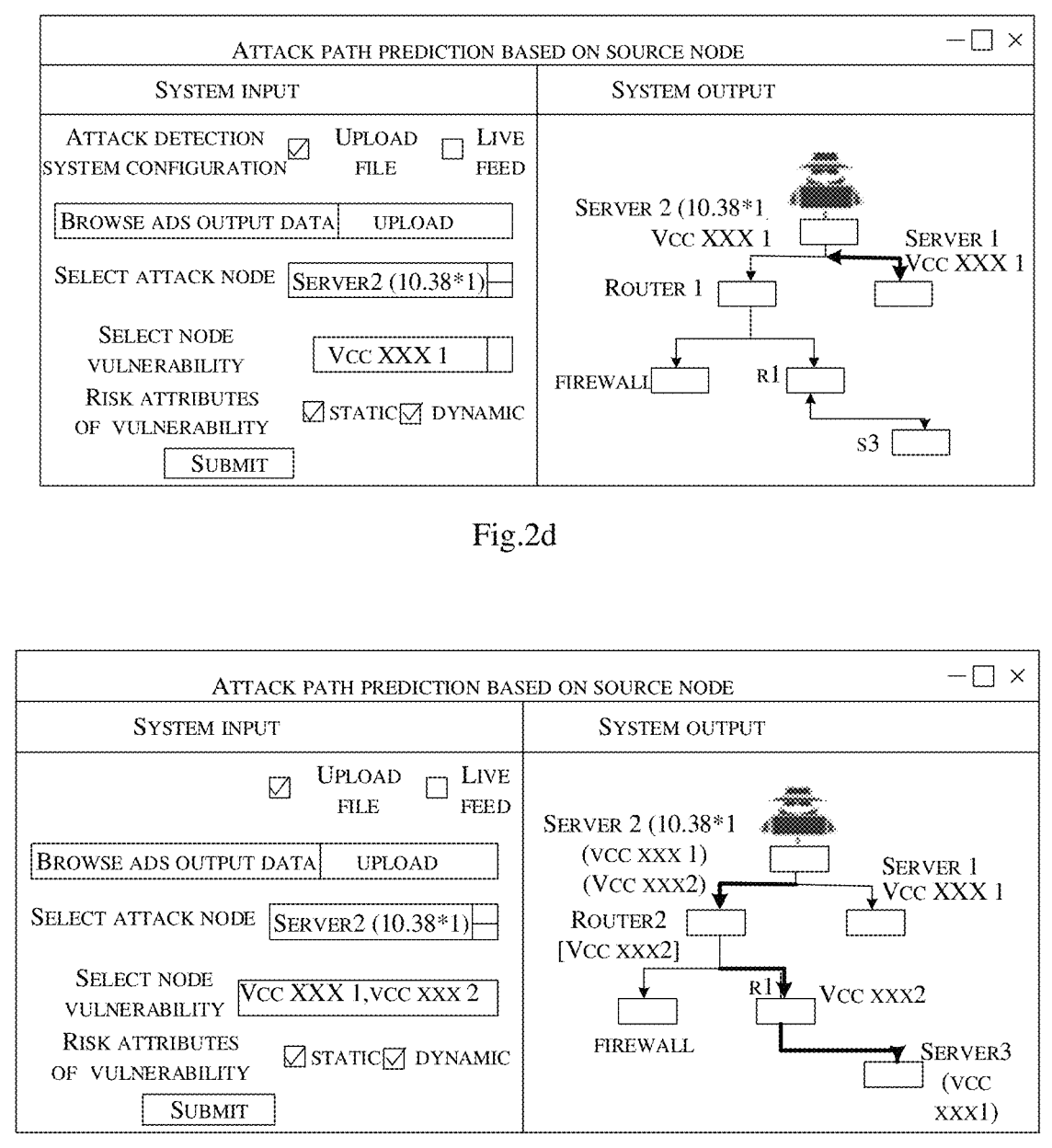
Figure 3:
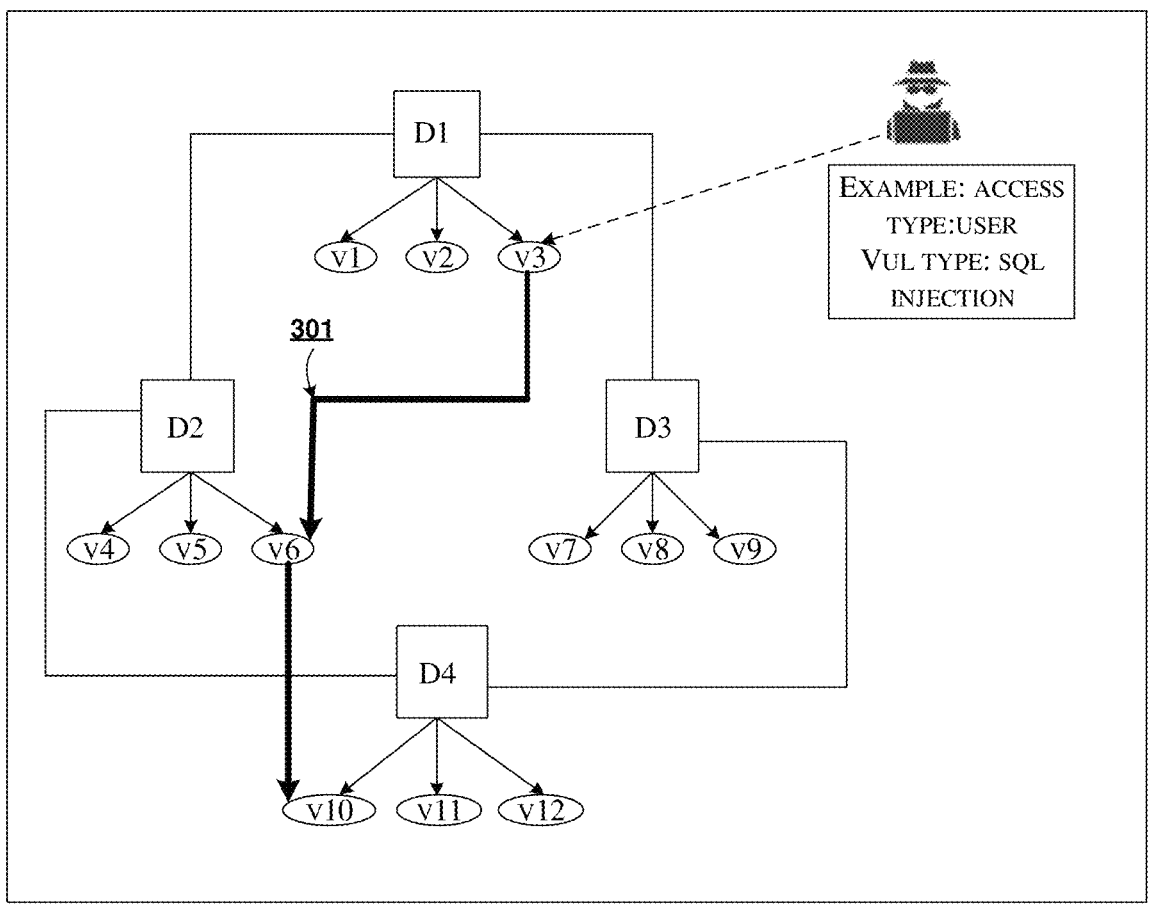
FIG. 3 show an exemplary representation of a network for predicting an attack path in accordance with some embodiments of the present disclosure.

Returning back to FIG. 2a, the prediction module 219 may predict the attack path for the network 105 based on the prediction score calculated by the prediction score calculation module 217. For instance, considering the FIG. 2b, the prediction module 219 may predict the attack path to be the target node 107₃ through V5. FIG. 2d-2e show exemplary representations of user interface depicting attack path on selection of one and two vulnerability respectively in accordance with some embodiments of the present disclosure. FIG. 2c and FIG. 2d shows an exemplary user interface for a system which is intended to configure with the attack detection system 103 to identify attacker intention. As shown in FIG. 2d and FIG. 2e, system output gives attack path and highlighted line describes predicted attack path. Attack path output in FIG. 2c is result of selection of single vulnerabilities. Similarly, the attack path output in FIG. 2d is result of two vulnerabilities. FIG. 3 show an exemplary representation of a network for predicting an attack path in accordance with some embodiments of the present disclosure.

Figure 4:
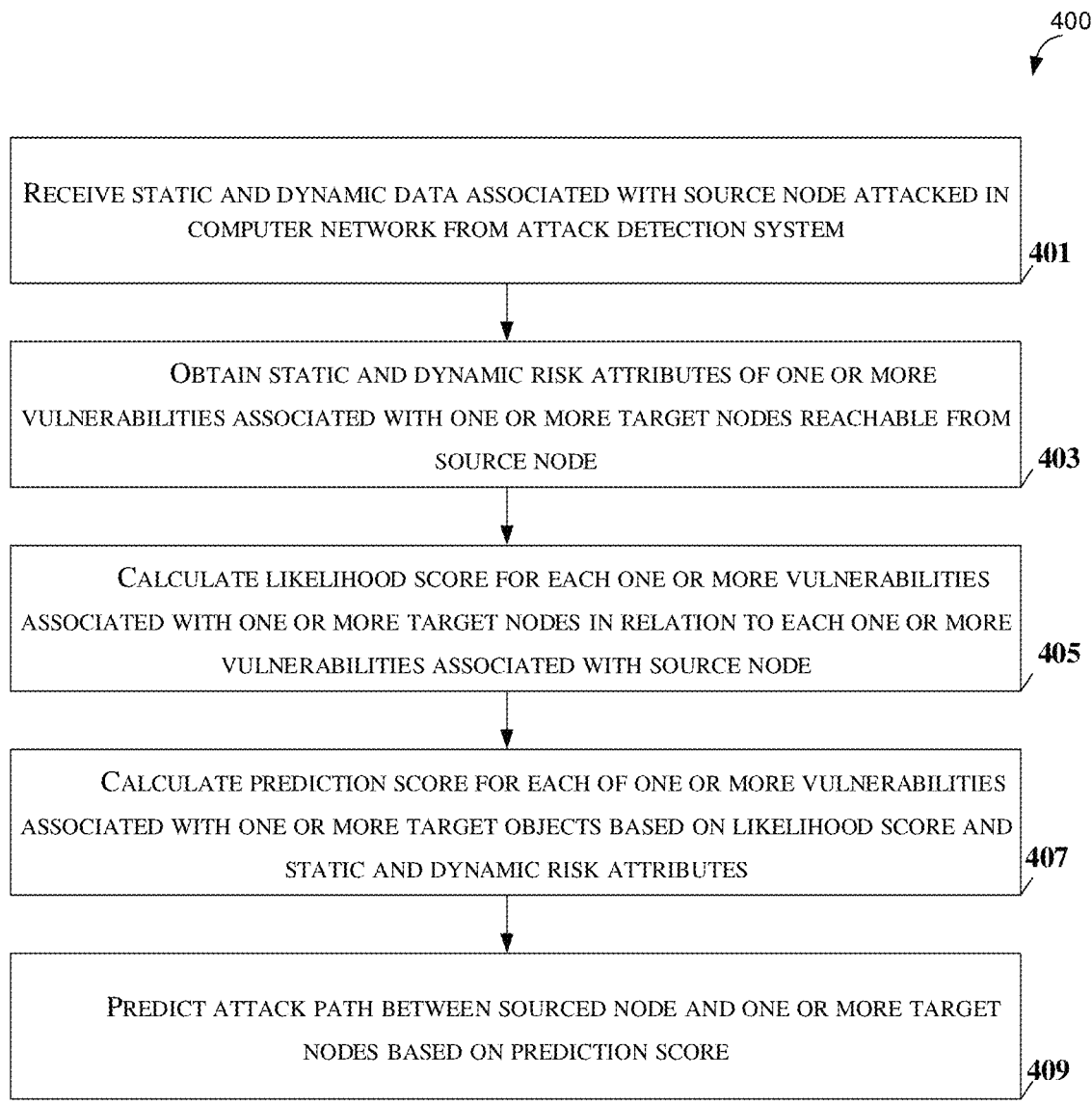
FIG. 4 illustrates a flowchart showing a method for predicting an attack path in a computer network in accordance with some embodiments of present disclosure.

FIG. 4 illustrates a flowchart showing a method for predicting an attack path in a computer network in accordance with some embodiments of present disclosure.

As illustrated in FIG. 4, the method 400 includes one or more blocks for predicting an attack path in a computer network. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the static and dynamic data associated with the source node is received by the receiving module 211 from the attack detection system 103. In an embodiment, the static and the dynamic data includes the information regarding the source node and one or more vulnerabilities associated with the source node.

At block 403, the static and dynamic risk attributes of one or more vulnerabilities associated with one or more target nodes is obtained by the risk attributes obtaining module 213. In an embodiment, the static risk attributes include the predefined Common Vulnerability Scoring System score (CVSS). In an embodiment, the dynamic risk attributes include the correlation score, the attacker skill indicator and the topological impact on node.

At block 405, the likelihood score for each of the one or more vulnerabilities associated with the one or more target nodes is calculated by the likelihood score calculation module 215 in relation to each of the one or more vulnerabilities associated with the source node based on the static and dynamic risk attributes.

At block 407, the prediction score for each of the one or more vulnerabilities associated with the one or more target nodes is calculated by the prediction score calculation module 217 based on the corresponding likelihood score and the static and dynamic risk attributes.

At block 409, the attack path between the source node and the one or more target nodes is predicted by the prediction module 219 in the network 105.

Computing System

Figure 5:
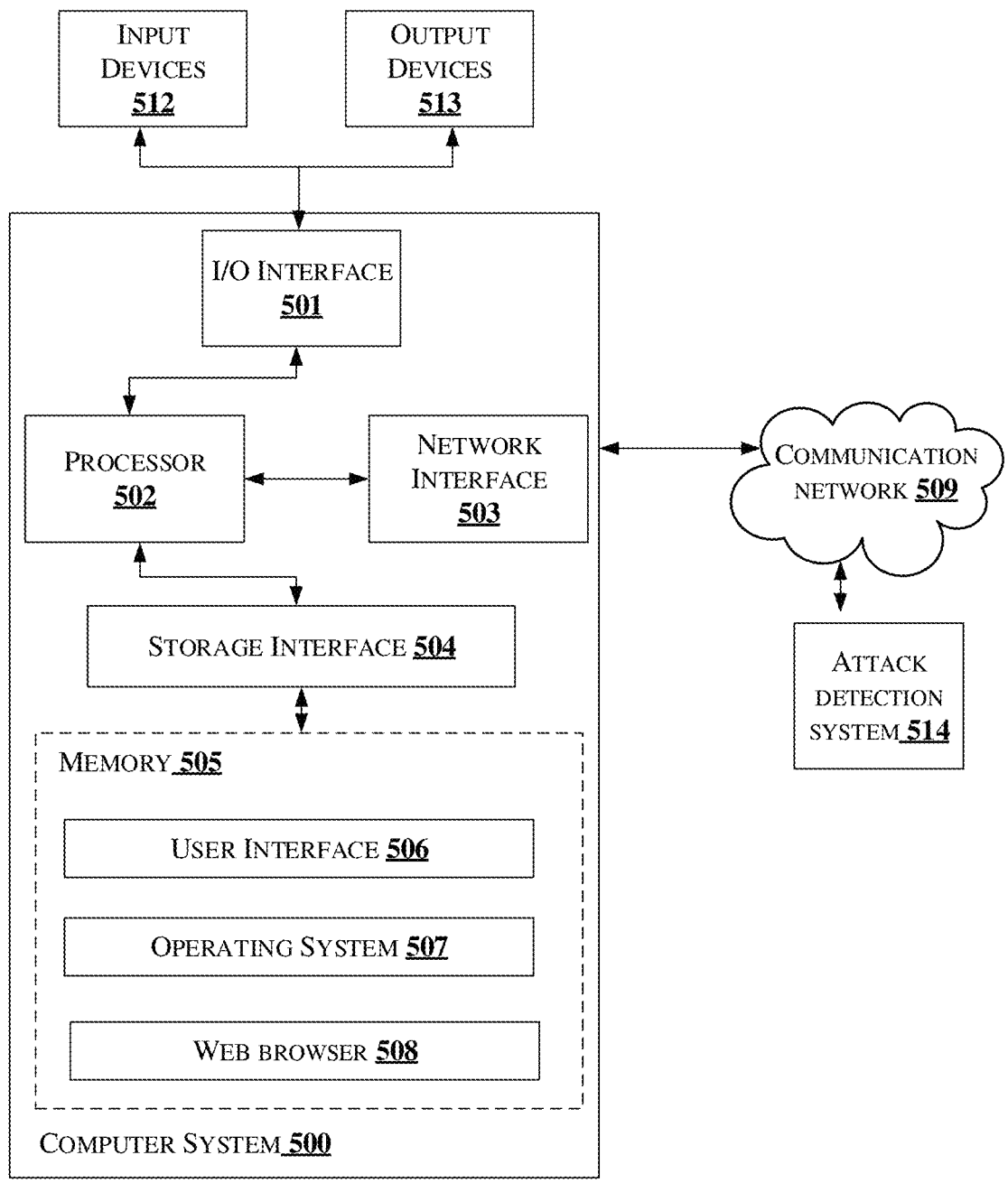
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be e attack path prediction system 101. The computer system 500 may include a central processing unit ("CPU" or "processor") 502. The processor 502 may include at least one data processor for predicting attack path in computer network. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices such as input devices 512 and output devices 513. For example, the input devices 512 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 513 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with an attack detection system 514. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 500 may implement a web browser 508 stored program component. The web browser 508 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 708 may utilize facilities such as AJAX™, DHTML™, ADOBE® FLASH™, JAVASCRIPT™, JAVA™, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP™, ACTIVEX™, ANSI™ C++/C #, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure predicts a precise attack path by correlating vulnerabilities using static as well as dynamic information. Thereby helping security operators to protect their network infrastructure more precisely.

An embodiment of the present disclosure performs a Root Cause Analysis (RCA) of cloud infrastructure. The present disclosure reduces effort by automating RCA process and increase the coverage of analysis in large infrastructure.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fibre, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | Environment |
| 101 | Attack path prediction system |
| 103 | Attack detection system |
| 105 | Network |
| 107 | Plurality of nodes |
| 109 | One or more vulnerabilities |
| 111 | Communication network |
| 113 | I/O interface |
| 115 | Memory |
| 117 | Processor |
| 200 | Data |
| 201 | Source node data |
| 203 | Risk attributes data |
| 205 | Attack path |
| 207 | Other data |
| 209 | Modules |
| 211 | Receiving module |
| 213 | Risk attributes obtaining module |
| 215 | Likelihood score calculation module |
| 217 | Prediction score calculation module |
| 219 | Prediction module |
| 221 | Other modules |
| 500 | Computer system |
| 501 | I/O interface |
| 502 | Processor |
| 503 | Network interface |
| 504 | Storage interface |
| 505 | Memory |
| 506 | User interface |
| 507 | Operating system |
| 508 | Web browser |
| 509 | Communication network |
| 512 | Input devices |
| 513 | Output devices |
| 514 | Attack detection system |

We claim:

1. A method of an attack path prediction system for predicting an attack path in a computer network, the computer network comprising a plurality of connected nodes, the system including a first computer which is an attack path prediction system, and a second computer which is an attack detection system implementing an intrusion detection system (IDS), the method comprising:
receiving, by the path prediction system, static and dynamic data associated with a source node attacked in the computer network from the IDS, wherein the static and dynamic data comprises information regarding the source node and one or more vulnerabilities associated with the source node;
obtaining, by the attack path prediction system, static and dynamic risk attributes of one or more vulnerabilities associated with one or more target nodes reachable from the source node in the computer network;
calculating, by the attack path prediction system, a likelihood score for each of the one or more vulnerabilities associated with the one or more target nodes in relation to each of the one or more vulnerabilities associated with the source node based on the static and dynamic risk attributes;
calculating, by the attack path prediction system, a prediction score for each of the one or more vulnerabilities associated with the one or more target nodes based on corresponding likelihood score and the static and dynamic risk attributes; and
predicting based on the prediction score, by the attack path prediction system, the attack path between the source node and the one or more target nodes in the computer network,
wherein the static risk attributes comprises predefined Common Vulnerability Scoring System score (CVSS),
wherein the likelihood score for each of the one or more vulnerabilities is calculated based on a corresponding correlation score and a Common Vulnerability Scoring System score (CVSS),
wherein the correlation score for each of the one or more vulnerabilities is calculated based on a number of attack intention common between a vulnerability of the one or more vulnerabilities associated with the source node and a vulnerability associated with each of the one or more target nodes and a total number of attack intention for the vulnerability associated with the source node.

2. The method as claimed in claim 1, wherein the prediction score for each of the one or more vulnerabilities is calculated based on the corresponding likelihood score and a corresponding Common Vulnerability Scoring System score (CVSS).

3. The method as claimed in claim 1 further comprising generating an attack path graph in the computer network based on the prediction score.

4. An attack path prediction system for predicting an attack path in a computer network, comprising:
a first processor; and
a first memory communicatively coupled to the processor;
a second computer which is an attack detection system implementing an intrusion detection system (IDS),
wherein the computer network comprises a plurality of connected nodes,
wherein the first memory stores first processor instructions, which, on execution, causes the first processor to:
receive static and dynamic data associated with a source node attacked in the computer network from the attack detection system, wherein the static and dynamic data comprises information regarding the source node and one or more vulnerabilities associated with the source node;

obtain static and dynamic risk attributes of one or more vulnerabilities associated with one or more target nodes reachable from the source node in the computer network;

calculate a likelihood score for each of the one or more vulnerabilities associated with the one or more target nodes in relation to each of the one or more vulnerabilities associated with the source node based on the static and dynamic risk attributes;

calculate a prediction score for each of the one or more vulnerabilities associated with the one or more target nodes based on corresponding likelihood score and the static and dynamic risk attributes; and predict based on the prediction score, the attack path between the source node and the one or more target nodes in the computer network, wherein the static risk attributes comprises predefined Common Vulnerability Scoring System score (CVSS), wherein the likelihood score for each of the one or more vulnerabilities is calculated based on a corresponding correlation score and a Common Vulnerability Scoring System score (CVSS), wherein the correlation score for each of the one or more vulnerabilities is calculated based on a number of attack intention common between a vulnerability of the one or more vulnerabilities associated with the source node and a vulnerability associated with each of the one or more target nodes and a total number of attack intention for the vulnerability associated with the source node.

5. The attack path prediction system as claimed in claim 4, wherein the processor calculates the prediction score for each of the one or more vulnerabilities based on the corresponding likelihood score and a corresponding Common Vulnerability Scoring System score (CVSS).

6. The attack path prediction system as claimed in claim 4, wherein the processor generates an attack path graph in the computer network based on the prediction score.

* * * * *